US00RE41718E

(19) United States
(12) Reissued Patent
Quimpo

(10) Patent Number: US RE41,718 E
(45) Date of Reissued Patent: Sep. 21, 2010

(54) TOILET PAPER DISPENSER AND FOLDER SYSTEM

(75) Inventor: Lester A. Quimpo, Bronx, NY (US)

(73) Assignee: Tursiop Technologies LLC, Cleveland, OH (US)

(21) Appl. No.: 11/004,793

(22) Filed: Dec. 3, 2004

Related U.S. Patent Documents

Reissue of:
(64) Patent No.: 6,651,922
Issued: Nov. 25, 2003
Appl. No.: 10/040,991
Filed: Jan. 7, 2002

(51) Int. Cl.
*B65H 35/06* (2006.01)
*B65H 18/08* (2006.01)
*B65H 20/02* (2006.01)

(52) U.S. Cl. ..... 242/526; 242/535.3; 242/537; 242/538; 242/546.1

(58) Field of Classification Search ..... 242/527, 242/527.1, 527.3, 526, 535, 535.3, 537, 538, 242/546.1, 564.4
See application file for complete search history.

(56) References Cited

U.S. PATENT DOCUMENTS

| | | | | | |
|---|---|---|---|---|---|
| 1,499,307 | A | * | 6/1924 | Parkes | 242/530.1 |
| 2,038,447 | A | * | 4/1936 | Reganato | 242/523.1 |
| 2,909,341 | A | * | 10/1959 | Kingsley | 242/151 |
| 3,721,398 | A | * | 3/1973 | Azzalin et al. | 242/532.5 |
| 5,660,313 | A | * | 8/1997 | Newbold | 225/42 |

FOREIGN PATENT DOCUMENTS

| | | | |
|---|---|---|---|
| GB | 2045722 | A | * 11/1980 |
| JP | 04297213 | A | * 10/1992 |
| JP | 2000139767 | A | * 5/2000 |

* cited by examiner

*Primary Examiner*—John Q Nguyen
*Assistant Examiner*—Scott Haugland
(74) *Attorney, Agent, or Firm*—Russ Weinzimmer; Russ Weinzimmer & Associates

(57) ABSTRACT

A toilet paper dispenser and folder system has a frame subassembly having front and rear parallel panels, an upper feeder roller and a lower feeder roller. Each panel has a large aperture and a paper roll holder aperture and a lower roller aperture and an upper roller slot. A paper rotation subassembly has a cylindrical housing with a cutting edge and a guide, and roller arm and a backplate. A pulley subassembly has a rotator bolt with two threaded ends and a bushing and threaded nuts and larger and smaller pulleys each with a central hole, and a belt between the pulleys.

1 Claim, 4 Drawing Sheets

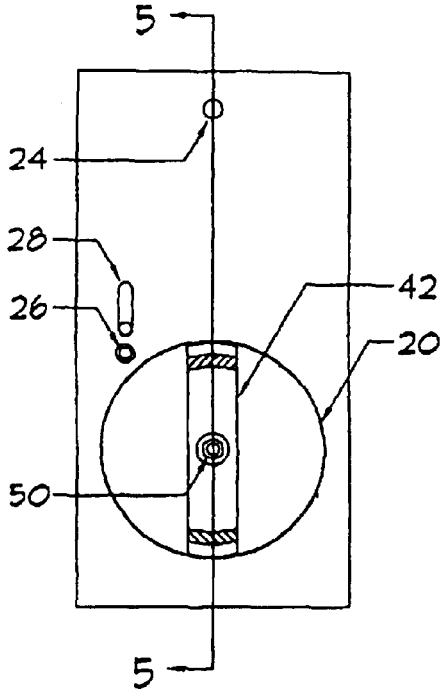
FIGURE 4
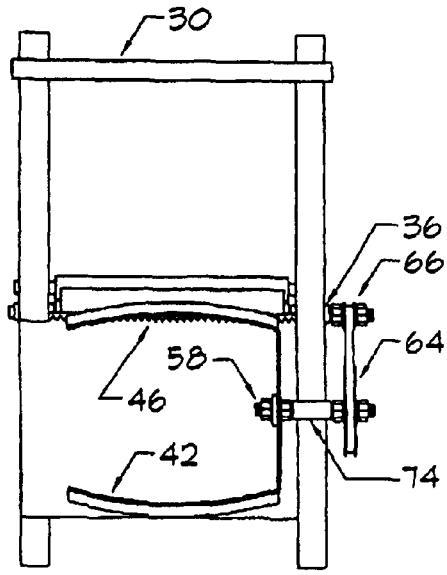
FIGURE 5
FIGURE 6
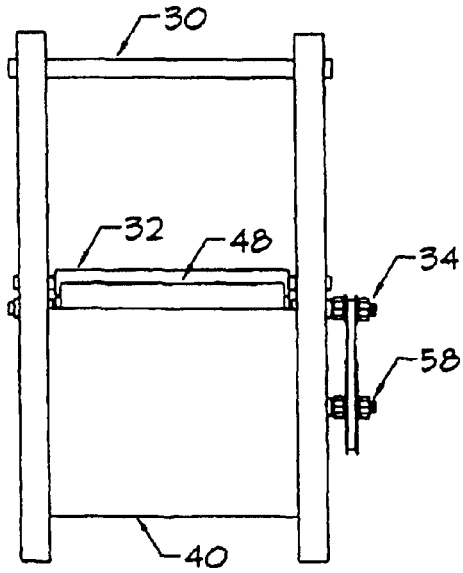

TOILET PAPER DISPENSER AND FOLDER SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a toilet paper dispenser and folder and more particularly pertains to dispensing a variety of paper lengths in a folded configuration in a sanitary and efficient manner.

2. Description of the Prior Art

The use of toilet paper dispensers of known designs and configurations is known in the prior art. More specifically, toilet paper dispensers of known designs and configurations previously devised and utilized for the purpose of dispensing lengths of paper through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,054,676, to Ban discloses a toilet roll holder. U.S. Pat. No. 5,058,792 to Morand discloses a bathroom tissue dispenser (large roll). U.S. Pat. No. 5,131,302 to Watanabe discloses an automatic toilet paper supplier. U.S. Pat. No. 5,454,500 to Chen discloses a toilet-paper holder. Lastly, U.S. Pat. No. 5,794,882 to Lewis discloses a toilet paper rotation limited having a plurality of ridges arranged in a plurality of concentric circles.

While these devices fulfill their respective, particular objectives and requirements, the aforementioned patents do not describe a toilet paper dispenser that allows dispensing a variety of paper lengths in a folded configuration in a sanitary and efficient manner.

In this respect, the toilet paper dispenser and folder according to the present invention substantially departs from the conventional concepts and designs of the prior art, and in doing so provides an apparatus primarily developed for the purpose of dispensing a variety of paper lengths in a folded configuration in a sanitary and efficient manner.

Therefore, it can be appreciated that there exists a continuing need for a new and improved toilet paper dispenser and folder which can be used for dispensing a variety of paper lengths in a folded configuration in a sanitary and efficient manner. In this regard, the present invention substantially fulfills this need.

SUMMARY OF THE INVENTION

In view of the foregoing disadvantages inherent in the known types of toilet paper dispensers of known designs and configurations now present in the prior art, the present invention provides an improved toilet paper dispenser. As such, the general purpose of the present invention, which will be described subsequently in greater detail, is to provide a new and improved toilet paper dispenser and method which has all the advantages of the prior art and none of the disadvantages.

To attain this, the present invention essentially comprises a frame subassembly. The frame subassembly has a front panel and a parallel rear panel. Each panel has a rectilinear configuration. Each panel has a large aperture and a paper roll holder aperture. Each panel also has a lower roller aperture and an upper roller slot. The panels are coupled by a dowel-like toilet paper roll holder coupled in each of the paper roll holder apertures. The frame subassembly also has an upper feeder roller and a lower feeder roller. The lower feeder roller has a thread on one end and is disposed between and coupled to the panels. The lower feeder roller couples to the lower roller apertures with a bushing on each of the panels to allow for a free rotation. The upper feeder roller ends are slidably accommodated into the slots of each of the panels. By gravity, the upper and lower feeder rollers touch each other. Thus, a rotation by the lower feeder roller results in a counter rotation of the upper feeder roller thereby creating a "pulling" action. Next provided is a paper rotation subassembly. The paper rotation subassembly has a cylindrical housing. The paper rotation subassembly also has a roller arm and a backplate. The cylindrical housing is fabricated of a rigid material having a hollow cylindrical configuration. The housing has a cutting edge and a guide. The roller arm has a bolt hole through the middle, is located within the spool, and has a generally slightly curved U-shaped configuration. The backplate is flat and circular with a centrally located shaft hole. Lastly, a pulley subassembly is provided. The pulley subassembly has a rotator bolt with two threaded ends and a bushing. The pulley subassembly also has a plurality of threaded nuts. The pulley subassembly has a larger pulley with a central hole and a smaller pulley with a central hole and a pulley belt. The larger pulley is coupled to the rotator bolt with a pair of threaded nuts. The rotator bolt is coupled to the roller arm with a pair of threaded nuts. Also the rotator bolt is coupled to the backplate with a bushing and a pair of threaded nuts which allows free rotation of the larger pulley and the roller arm. The smaller pulley is coupled to the lower roller with a pair of threaded nuts. The pulleys are coupled and driven by the pulley belt. In this manner a user may rotate the roller arm clockwise and pull the paper from the roll, between the feeder rollers into the spool and onto the arm, to achieve the desired plurality of layers. The arm rotation is reversed and the paper is cut and then removed through the aperture in the front panel.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved toilet paper dispenser and folder which has all of the advantages of the prior art toilet paper dispensers of known designs and configurations and none of the disadvantages.

It is another object of the present invention to provide a new and improved toilet paper dispenser and folder which may be easily and efficiently manufactured and marketed.

It is further object of the present invention to provide a new and improved toilet paper dispenser and folder which is of durable and reliable constructions.

An even further object of the present invention is to provide a new and improved toilet paper dispenser and folder which is susceptible of a low cost of manufacture with regard to both materials and labor, and which accordingly is then susceptible of low prices of sale to the consuming public, thereby making such toilet paper dispenser and folder economically available to the buying public.

Even still another object of the present invention is to provide a toilet paper dispenser and folder for dispensing a variety of paper lengths in a folded configuration in a sanitary and efficient manner.

Lastly, it is an object of the present invention to provide a new and improved toilet paper dispenser and folder system. The system has a frame subassembly with front and rear parallel panels, an upper feeder roller and a lower feeder roller. Each panel has a large aperture and a paper roll holder aperture and a lower roller aperture and an upper roller. slot. A paper rotation subassembly has a cylindrical housing with a cutting edge and a guide, and roller arm and a backplate. A pulley subassembly has a rotator bolt with two threaded ends and a bushing and threaded nuts and larger and smaller pulleys each with a central hole, and a belt between the pulleys.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a front elevational view of the system shown in FIG. 1.

FIG. 5 is a cross-sectional view of the system taken along line 5—5 of FIG. 4.

FIG. 6 is a right side elevational view of the system shown in FIG. 1.

The same reference numerals refer to the same parts throughout the various Figures.

DESCRIPTION OF THE PREFERRED EMBODIMENT

Figure 1:
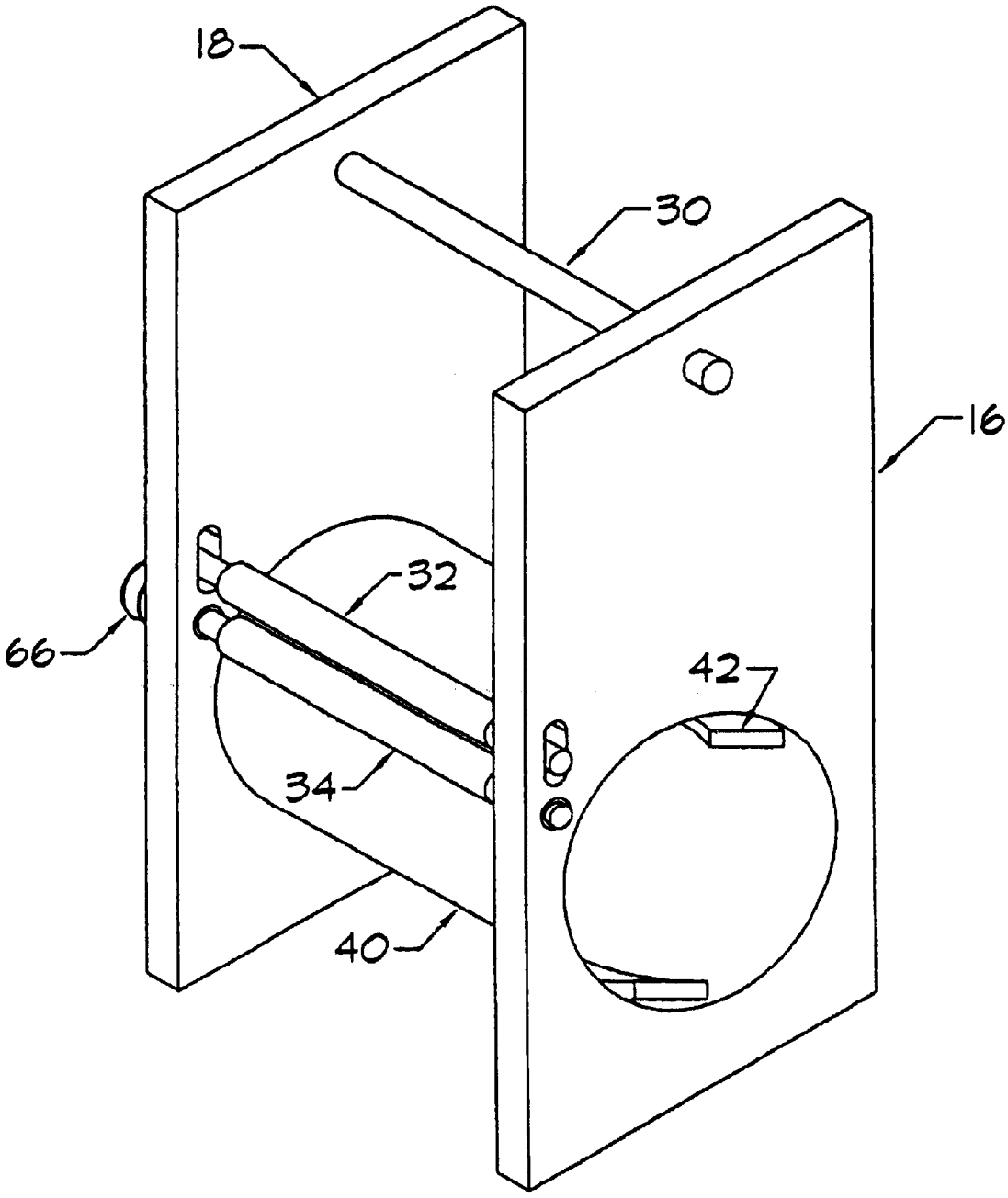
FIG. 1 is a perspective illustration of the toilet paper dispenser system constructed in accordance with the principles of the present invention.
Figure 2:
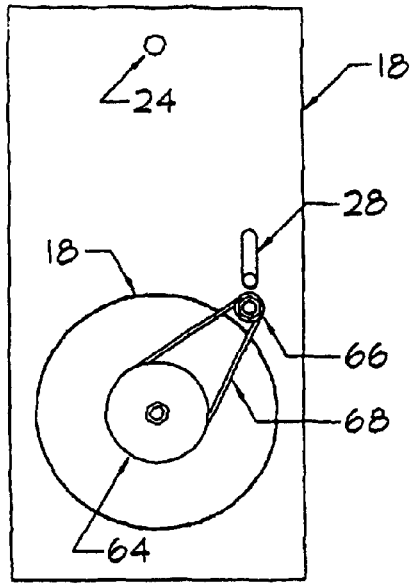
FIG. 2 is a rear elevational view of the system shown in FIG. 1.
Figure 3:
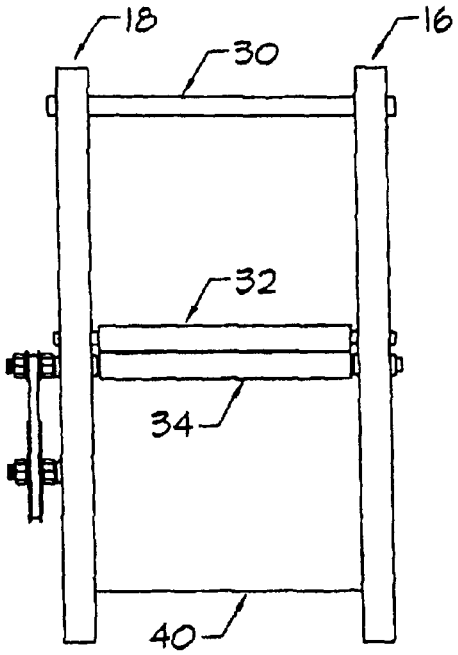
FIG. 3 is a left side elevational view of the system shown in FIG. 1.
Figure 7:
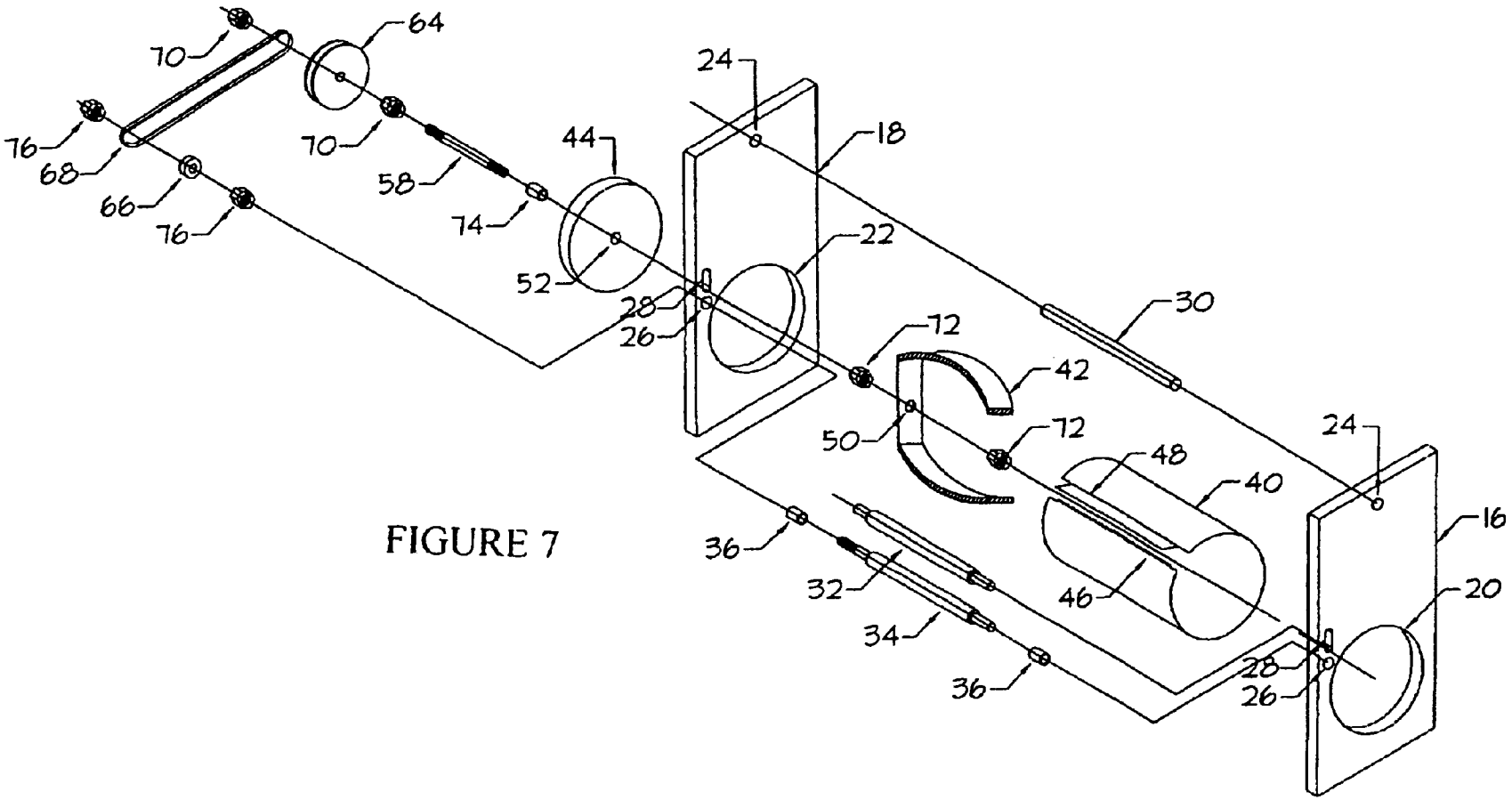
FIG. 7 is an exploded perspective view of the system shown in the prior Figures.

With reference now to the drawings, and in particular to FIG. 1 thereof, the preferred embodiment of the new and improved toilet paper dispenser and folder embodying the principles and concepts of the present invention and generally designated by the reference numeral 10 will be described.

The present invention, the toilet paper dispenser and folder 10 is comprised of a plurality of components. Such components in their broadest context include a frame subassembly, a paper rotation subassembly, and a pulley subassembly. Such components are individually configured and correlated with respect to each other so as to attain the desired objective.

First provided is a frame subassembly 14. The frame subassembly has a front panel 16 and a parallel rear panel 18. Each panel has a rectilinear configuration. Each panel has a large aperture 20, 22 and a paper roll holder aperture 24. Each panel also has a lower roller aperture 26 and an upper roller slot 28. The panels are coupled by a dowel-like toilet paper roll holder 30 coupled in each of the paper roll holder apertures. The frame subassembly also has an upper feeder roller 32 and a lower feeder roller 34. The lower feeder roller has a thread on one end and is disposed between and coupled to the panels. The lower feeder roller couples to the lower roller apertures with a bushing 36 on each of the panels to allow for a free rotation. The upper feeder roller ends are slidably accommodated into the slots of each of the panels. By gravity, the upper and lower feeder rollers touch each other thus a rotation by the lower feeder roller results in a counter rotation of the upper feeder roller creating a pulling action.

Next provided is a paper rotation subassembly 38. The paper rotation subassembly has a cylindrical housing 40. The paper rotation subassembly also has a roller arm 42 and a backplate 44. The cylindrical housing is fabricated of a rigid material having a hollow cylindrical configuration. The housing has a cutting edge 46 and a guide 48. The roller arm has a bolt hole 50 through the middle, is located within the spool, and has a generally slightly curved U-shaped configuration. The backplate is flat and circular with a centrally located shaft hole 52.

Lastly, a pulley subassembly 56 is provided. The pulley subassembly has a rotator bolt,58 with two threaded ends and a bushing. The pulley subassembly also has a plurality of threaded nuts. The pulley subassembly has a larger pulley 64 with a central hole and a smaller pulley 66 with a central hole and a pulley belt 68. The larger pulley is coupled to the rotator bolt with a pair of threaded nuts 70. The rotator bolt is coupled to the roller arm with a pair of threaded nuts 72. Also the rotator bolt is coupled to the backplate with a bushing 74 and a pair of threaded nuts which allows free rotation of the larger pulley and the roller arm. The smaller pulley is coupled to the lower roller with a pair of threaded nuts 76. The pulleys are coupled and driven by the pulley belt. In this manner a user may rotate the roller arm clockwise and pull the paper from the roll, between the feeder rollers into the spool and onto the arm to achieve the desired plurality of layers. The arm rotation is reversed and the paper is cut and then removed through the aperture in the front panel.

The present invention is a toilet paper dispenser and folder. It is all about convenience. We have been doing our thing with toilet papers for as far back as we can remember, whether we are a hand wrapper, a folder, or a scruncher. Surely we find our ways of preparing it, either awkward, messy, inconvenient or wasteful and yet we never complained. We did not because our only choice then was either to use it or not.

The present invention is the option to be. It is the answer to a fast, neat and easy way to prepare a perfect toilet paper all the time. Enough of those awkward and messy folds or refolds when it comes out too small or not thick enough. No more searching for that elusive free end of paper especially when it is dim. With the present invention you can regulate the thickness you want each time.

To start a fresh roll of toilet paper:

a. Secure a roll of toilet paper on the paper holder. Insert the free end of the toilet paper in between the upper and lower feeder rollers. The upper feeder roller is in a slot so it can easily move up and down.

b. To start a fold. With a finger, turn the roller arm clockwise only. The larger pulley and the smaller pulley are connected by a belt. Turning the roller arm transmits motion to the feeder assembly and feeds the free end of the paper into the cylindrical housing. With further turning, the roller arms will catch the free end of the paper and drag it against the cylindrical housing wall thus initiating the fold.

c. To cut. When the desired thickness is achieved, hold the entire width of paper and turn counterclockwise cutting it against the cutter.

d. Pull out the folded paper. After the cut, the free end of the paper remains inside of the cylindrical housing held down by the weight of the lower feeder roller and ready for the next use.

The parts list is as follows:

10 system
14 frame subassembly
16 front panel
18 rear panel
20 aperture
22 aperture
24 toilet paper holder aperture
26 lower roller aperture
28 upper roller slot
30 toilet paper holder
32 upper feeder roller
34 lower feeder roller
36 bushings
38 paper rotation subassembly
40 cylindrical housing
42 roller arm
44 backplate
46 cutting edge
48 guide
50 bolt hole
52 shaft hole
56 pulley subassembly
58 rotation bolt
64 larger pulley
66 smaller pulley
68 pulley belt
70 nuts
72 nuts
74 bushing
76 nuts As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A toilet paper dispenser and folder system for dispensing a variety of paper *strip* lengths in a folded configuration *and* in a sanitary and efficient manner*, said system* comprising[, in combination;]*:* a frame [sub] assembly having a [front panel and a parallel rear panel, each panel having a rectilinear configuration, with each panel having a large aperture and a] paper roll holder [aperture and a lower roller aperture and] *and a front panel with* an [upper roller slot with the panels being coupled by a dowel-like toilet paper roll holder coupled in each of the paper roll holder apertures, the frame subassembly also having an upper feeder roller and a lower feeder roller, with the lower feeder roller having a thread on one end and being disposed between and coupled to the panels, the lower feeder roller coupling to the lower roller apertures with a bushing on each of the panels thereby rotating freely and with the upper feeder roller ends being slidably accommodated into the slots of each of the panels, by gravity the upper and lower feeder rollers touch each other thus a rotation by the lower feeder roller results in a counter rotation of the upper feeder roller creating a pulling action;] *aperture;*

[a paper rotation subassembly having a cylindrical housing and a roller arm and a backplate, the cylindrical housing being fabricated of a rigid material having a hollow cylindrical configuration having a cutting edge and a guide, and the roller arm having a bolt hole through the middle and being located within the cylindrical housing and having a generally slightly curved U-shaped configuration, and backplate being flat and circular with a centrally located shaft hole; and a pulley subassembly having a rotator bolt with two threaded ends and a bushing and a plurality of threaded nuts and a larger pulley with a central hole and a smaller pulley with a central hole and a pulley belt, with the rotator bolt being coupled to the roller arm with a pair of threaded nuts, and with the rotator bolt being coupled to the backplate with a bushing and a pair of threaded nuts, thereby rotating freely, the larger pulley being coupled to the rotator bolt with a pair of threaded nuts, the smaller pulley being coupled to the lower roller with a pair of threaded nuts and the pulleys being coupled and driven by the pulley belt whereby a user may rotate the roller arm clockwise and pull the paper from the roll, between the feeder rollers into the spool and onto the arm to achieve the desired plurality of layers whereby the arm rotation is reversed and the paper is cut and then removed through the aperture in the front panel.] *a first feeder roller and a second feeder roller arranged in the frame assembly in adjacent parallel relationship to form a nip between them;*

*a paper strip winder arranged in the frame assembly behind the front panel, and having a pair of opposed, parallel paper receiving surfaces upon which the paper strip may be wound to create a plurality of layers; and*

*a roller driver capable of cooperatively rotating said paper strip winder and at least one of the first and second feeder rollers so as to create a pulling action for a paper strip disposed in said nip,*

*said paper strip winder being rotatable about an axis thereof which is substantially parallel to said paper receiving surfaces,*

*said frame assembly further comprising a cylinder coaxially disposed on said axis and disposed adjacent to the aperture in the front panel and surrounding the paper receiving surfaces in close proximity for retaining the paper strip on the receiving surfaces, said cylinder having an opening in a side extending parallel to a central cylinder axis for insertion of the paper strip, one side edge of the opening having a cutting edge,*

*said feeder rollers being located outside the cylinder,*

*said dispenser being operative to draw the paper strip from a paper roll in said paper roll holder, between the feeder rollers and onto the receiving surfaces of the paper strip winder, to form the desired plurality of layers, whereby the paper strip may be severed by the cutting edge between the paper roll and the layers, and may be removed through the aperture in the front panel.*

[2. A toilet paper dispenser and folder system comprising;

a frame subassembly having a front panel and a parallel rear panel each having a large aperture and a paper roll holder aperture and a lower roller aperture and an upper roller slot, the frame subassembly also having an upper feeder roller and a lower feeder roller;

a paper rotation subassembly having a cylindrical housing with a cutting edge and a guide, a rotatable roller arm located within the cylindrical housing and in close proximity to the wall thereof, and a backplate fastened to the roller arm, the feeder rollers being located outside of the cylindrical housing; and a pulley subassembly connecting one of the feeder rollers and the roller arm and having a rotator bolt with two threaded ends and a bushing and a plurality of threaded nuts and a larger pulley with a central hole and a smaller pulley with a central hole and a pulley belt there between.]

[3. The system as set forth in claim 2 whereby a user may rotate the roller arm clockwise and pull the paper from the roll, between the feeder rollers into the cylindrical housing and onto the arm to achieve the desired plurality of layers whereby the arm rotation is reversed and the paper is cut and then removed through the aperture in the front panel.]

[4. The system as set forth in claim 2 wherein the roller arm has a bolt hole through the middle and has a generally slightly curved U-shaped configuration.]

* * * * *

UNITED STATES PATENT AND TRADEMARK OFFICE

CERTIFICATE OF CORRECTION

PATENT NO. : RE41,718 E
APPLICATION NO. : 11/004793
DATED : September 21, 2010
INVENTOR(S) : Lester A. Quimpo It is certified that error appears in the above-identified patent and that said Letters Patent is hereby corrected as shown below:

On the front of patent, Item (73)

Assignee: Please remove Tursiop Technologies LLC and Replace with None

Signed and Sealed this
Nineteenth Day of April, 2011

David J. Kappos

David J. Kappos
*Director of the United States Patent and Trademark Office*